United States Patent
Aleksandrowicz

(10) Patent No.: US 7,551,575 B1
(45) Date of Patent: Jun. 23, 2009

(54) CONTEXT-SWITCHING MULTI CHANNEL PROGRAMMABLE STREAM PARSER

(75) Inventor: Dan Aleksandrowicz, Modiyin (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 1325 days.

(21) Appl. No.: 10/287,947

(22) Filed: Nov. 5, 2002

(51) Int. Cl.
H04B 7/00 (2006.01)
H04B 7/212 (2006.01)
H04W 4/00 (2009.01)
H04L 12/28 (2006.01)

(52) U.S. Cl. .................... 370/321; 370/310.1; 370/394; 370/395.52; 370/905; 370/338

(58) Field of Classification Search ................. 370/321, 370/310.1, 394, 395.1, 395.52, 905
See application file for complete search history.

(56) References Cited

U.S. PATENT DOCUMENTS

| | | | | |
|---|---|---|---|---|
| 5,379,297 A * | 1/1995 | Glover et al. | | 370/234 |
| 5,440,545 A * | 8/1995 | Buchholz et al. | | 370/426 |
| 5,617,541 A * | 4/1997 | Albanese et al. | | 709/207 |
| 5,805,808 A | 9/1998 | Hasani et al. | | 370/392 |
| 5,844,901 A * | 12/1998 | Holden et al. | | 370/399 |
| 5,870,394 A * | 2/1999 | Oprea | | 370/392 |
| 5,913,042 A | 6/1999 | Shemla et al. | | 370/429 |
| 5,999,981 A | 12/1999 | Willenz et al. | | 709/238 |
| 6,212,183 B1 | 4/2001 | Wilford | | 370/392 |
| 6,233,637 B1 * | 5/2001 | Smyers et al. | | 710/311 |
| 6,240,065 B1 | 5/2001 | Medina et al. | | 370/229 |
| 6,249,525 B1 * | 6/2001 | Aggarwal et al. | | 370/413 |
| 6,304,553 B1 | 10/2001 | Gehman et al. | | 370/235 |
| 6,427,169 B1 | 7/2002 | Elzur | | 709/224 |
| 6,658,440 B1 * | 12/2003 | Pisek et al. | | 708/300 |
| 6,665,285 B1 * | 12/2003 | Treadaway et al. | | 370/338 |
| 7,286,483 B2 * | 10/2007 | Connor | | 370/252 |
| 2002/0009094 A1 | 1/2002 | Medina et al. | | 370/429 |
| 2003/0078964 A1 * | 4/2003 | Parrella et al. | | 709/203 |
| 2003/0152069 A1 * | 8/2003 | Schkilnik et al. | | 370/369 |

* cited by examiner

*Primary Examiner*—Vincent P Harper
*Assistant Examiner*—Ariel Balaoing

(57) ABSTRACT

A stream parser for receiving, parsing, and/or pre-processing network data traffic directly from an incoming unreconstructed data stream. To extract meaningful data from the unreconstructed data stream, the stream parser employs a context switch module for re-forming parts of packet headers as the data stream is streaming through the stream parser. The stream parser includes a logic unit operated by microcode stored in a program module, as well as a channel configuration memory controlled by software in a master processor. Because of this combination of hardware processing and software control, the stream parser is both quick and flexible.

100 Claims, 3 Drawing Sheets

CONTEXT-SWITCHING MULTI CHANNEL PROGRAMMABLE STREAM PARSER

BACKGROUND OF THE INVENTION

1. Field of the Invention

The present invention relates generally to an apparatus, system, and method for parsing incoming data traffic, and specifically to an apparatus, system, and method for parsing incoming time division multiplexed (TDM) data traffic before reconstructing the originally transmitted data packets.

2. Description of the Related Art

In a conventional data communication system, a network controller performs many functions including parsing incoming data to identify instructions or commands. The data is then processed in accordance with those instructions or commands. In a data communication system in which multiple incoming channels are being received, the network controller must receive the data packets on each of these channels and then parse the received packets to determine what to do with them, e.g., where to forward the packets, in what order the packets should be reassembled, etc. Thus, the received packets must be stored in memory while the network controller reconstructs the originally transmitted packets and then determines what to do with them.

An exemplary data communication system is conceptually illustrated in FIG. 1. The different components in FIG. 1 should be understood as functional modules, which can be combined or further divided as necessary for implementing a particular embodiment.

In FIG. 1, a Network Controller 50 receives and transmits data traffic between a Wide Area Network (WAN) 110 and Local Area Network (LAN) 130. WAN 110 covers a large amount of addressable processors and/or a large geographic area, and can be understood as, for example, the Internet which uses IP/TCP (Internet Protocol/Transmission Control Protocol) communications links, or a Public Switched Telephone Network (PSTN). LAN 130 covers a smaller amount of addressable processors and/or a smaller geographical area, and can be understood as, for example, a bus-based network (e.g., Ethernet, IEEE 802.3), a ring-based network (e.g., Fiber Distributed Data Interface or Token Ring), or a tree-based or star-based network.

Communication link 105 connects WAN 110 with LAN 130 under control of Network Controller 50. Data traffic is received in a time division multiplexed (TDM) format, where different channels occupy different time slots. How this is done depends on the nature of the communications link (e.g., a T1 or E1 carrier) and/or the particular protocol used (e.g., Frame Relay). Although the network controller shown here is located between a WAN and a LAN, it should be understood that the present invention, as described hereinbelow, can apply to any device performing the activities of a network controller, regardless of the type, or types, of network to which the device is connected, the protocols used therein, or the transmission media on which the data traffic is carried.

Network Controller 50 processes this incoming data stream in order to properly route, unpack, and identify the communications units, e.g., packets, bundles, frames, etc. For example, Network Controller 50 must identify the arriving bytes as belonging to a particular channel, and/or as belonging to a particular larger communications unit, etc. To accomplish this, Network Controller 50 must store arriving bytes to form larger communication units, such as packets. This is further complicated by the fact that the individual bits are arriving on different TDM channels, so that they need to be separated into different waiting queues for grouping into larger communication units (e.g., packets). Another layer of complication is added when connectionless packets (such as IP/TCP packets from the Internet) are received on a channel, because these packets can arrive in any order, thus requiring the network controller to not only reassemble the individual packets, but to also wait for out-of-order packets, and put them in the correct order.

Thus, the network controller spends an inordinate amount of time waiting for bytes and larger communication units, such as packets or a series of packet fragments, to form from the individual bits arriving on each channel. Furthermore, certain control and organization information stored in particular locations within a communication unit (e.g., the header in a data packet) will not be parsed by the network controller until the communication unit has completely formed, further adding to delay and wasted resources (i.e., for some of the data, no processing occurs, only storing and reassembling, for multiple clock cycles). It is only after this initial data link processing that the incoming packets can be brought up through the higher layers of the communication protocol stack, e.g., the TCP/IP protocol stack.

In order to reduce the delays caused by this initial data link processing, conventional network controllers or interfaces have added dedicated hardware to the data path to perform the initial data link processing. This added hardware relieves the main processor of the network controller of the initial processing, thereby allowing the main processor to focus on higher level processing. Because one of the main functions of such added hardware is to identify flows and parse data packets, it is sometimes called a "packet parser".

However, prior art packet parsers are typically limited to specific protocols, and/or types of networks. This lack of flexibility is further compounded by the fact that typical packet parsers are "hard-wired" to perform particular tasks (e.g., serial-to-parallel conversion, identifying flows to which a packet belongs, authenticating packets, decrypting packets, forwarding packets to memory buffers, etc.). There is no possibility of providing different processing for packets on different channels. Furthermore, typical packet parsers slow down the incoming data flow in order to perform their parsing function. Further still, typical packet parsers are completely unsuited for receiving TDM data traffic, where the incoming data stream jumps from channel to channel, resulting in bytes from different channels (and, thusly, different packets) arriving at substantially the same time.

Therefore, there is a need for an apparatus, system, and method by which data traffic received on multiple channels in a TDM data stream can be efficiently parsed or pre-processed. Furthermore, there is a need for an apparatus, system, and method for parsing and/or pre-processing an incoming multi-channel TDM data stream without slowing down the incoming data flow.

SUMMARY OF THE INVENTION

The present invention provides a "flow-through" apparatus, system, and method by which information is extracted from an incoming data stream, without stopping the data stream to reconstruct data packets. The inventive apparatus, or "stream parser", can extract any information from any packet on any channel in a multi-channel TDM data stream. Furthermore, the stream parser can perform pre-processing (e.g., modifying bits or bytes of a packet, discarding packets, deleting fragment headers, etc.) before the data stream is processed by the network controller.

In order to extract meaningful data from, and/or pre-process packets on, the unreconstructed data stream, the stream parser employs a context switch module for re-forming parts of packet headers as the data stream flows through the stream parser. The stream parser includes at least a logic unit (or microsequencer), a program module which holds microcode that runs on the logic unit, and a channel configuration memory controlled by software in a master processor. Because of this combination of hardware processing and software control, the stream parser is both quick and flexible.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENT

In its broadest aspect, the present invention provides an apparatus, system, and method for parsing and/or pre-processing incoming network data traffic while forwarding the network data traffic to a network controller. The inventive apparatus, or "stream parser", allows incoming data traffic to "flow through", i.e., the stream parser does not stop the incoming data stream to reconstruct the originally transmitted packets.

The stream parser according to the present invention is (1) capable of extracting data from incoming data traffic and/or pre-processing the incoming data stream before the incoming data stream is reconstructed by the network controller into communication units; (2) programmable by a master processor; (3) capable of context switching in order to process multiple channels substantially simultaneously; (4) capable of being configured and controlled on a channel by channel basis by a master processor; and (5) capable of parsing incoming data traffic at a much greater granularity than a conventional network controller (e.g., parsing at a bit or byte level rather than packet level).

It is presently contemplated that the present invention is implementable in an ASIC (Application Specific Integrated Circuit). It should be recognized that the invention may be implemented by an appropriately programmed microprocessor.

Figure 1:
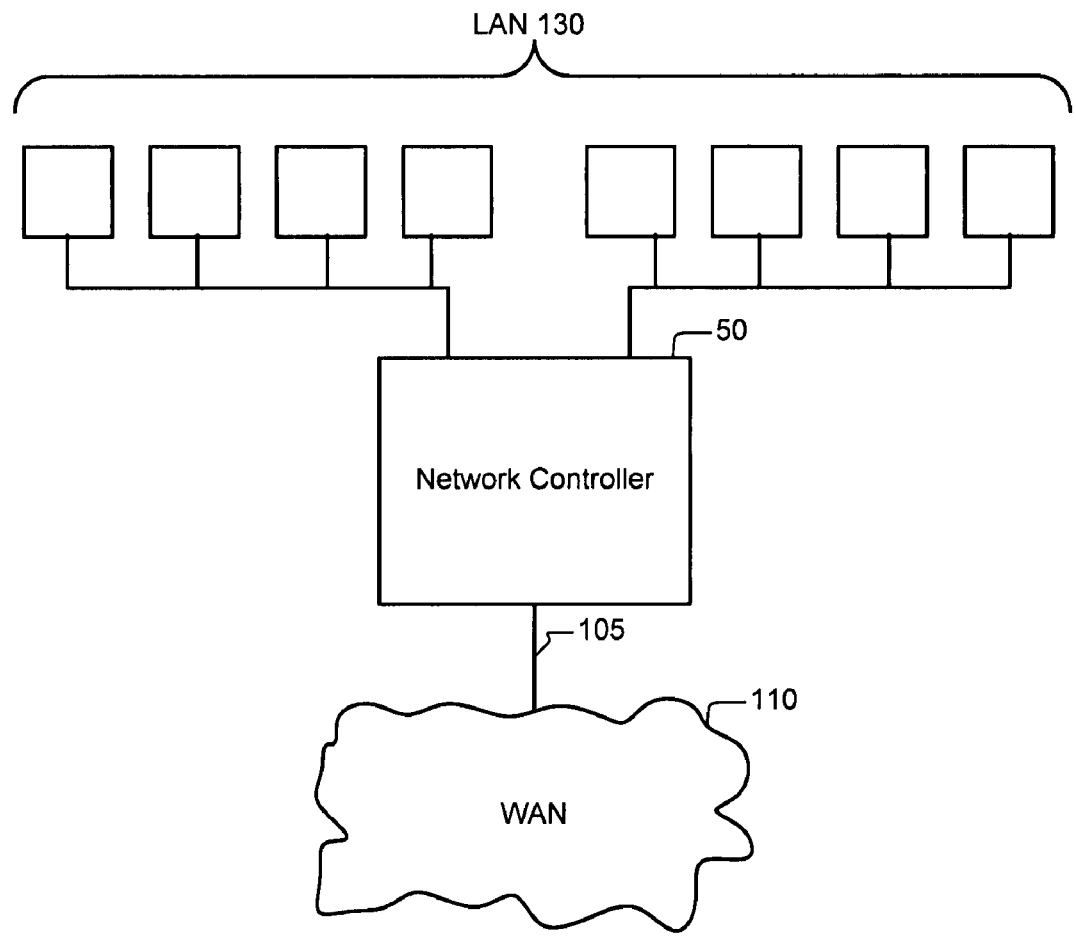
FIG. 1 is a block diagram of a conventional prior art data communication system.
Figure 2:
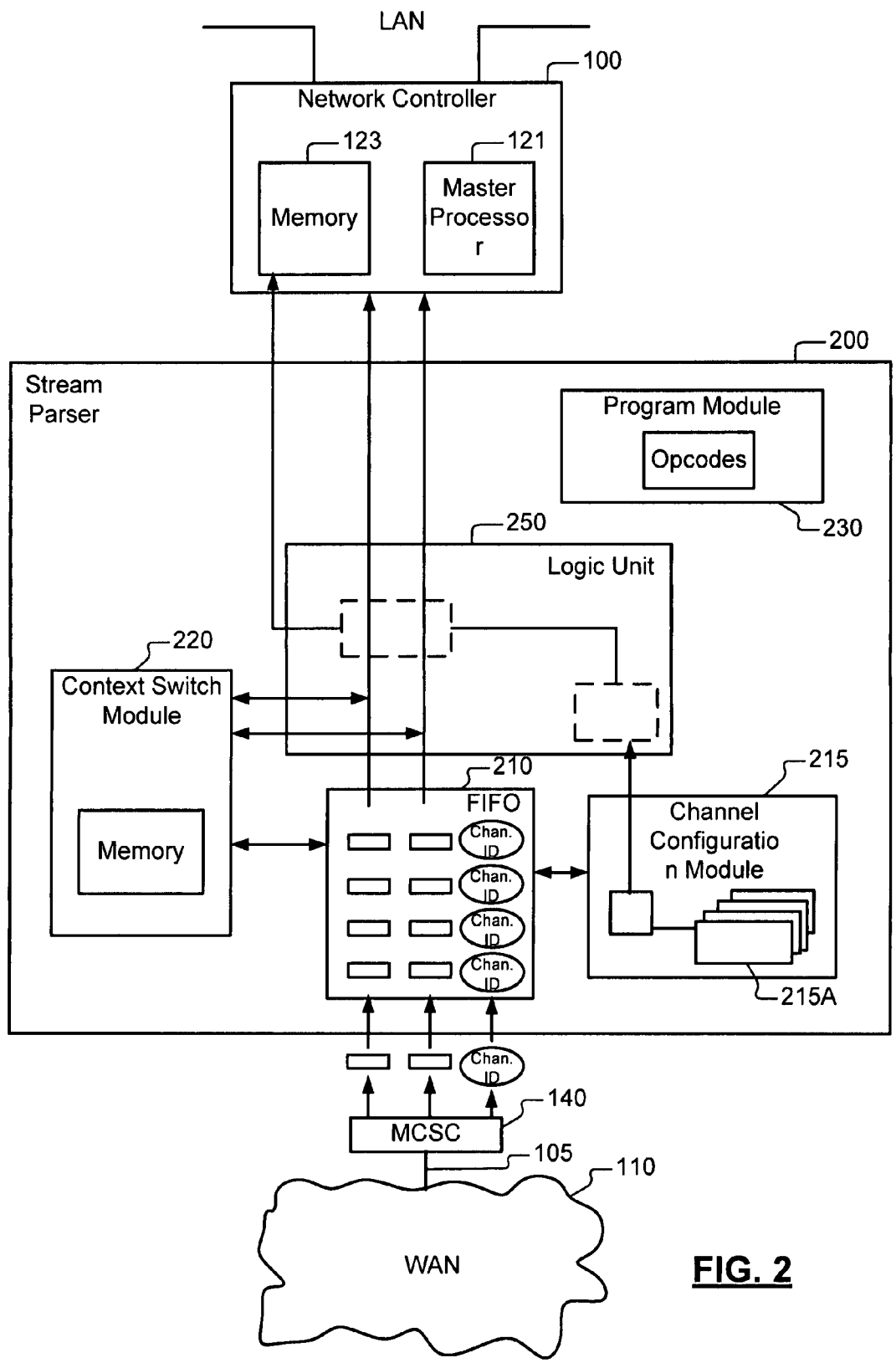
FIG. 2 is a block diagram of a data communication system with a stream parser according to a preferred embodiment of the present invention.

FIG. 2 is a block diagram of a preferred embodiment of the present invention. Unlike the system in FIG. 1, Stream Parser (SP) 200 and Multi-Channel Serial Controller (MCSC) 140 are inserted to receive the incoming data stream before the Network Controller 100. Although SP 200 and MCSC 140 are shown in FIG. 2 as separate modules from Network Controller 100, in practice both SP 200 and MCSC 140 would be integrated into Network Controller 100. They are shown as separate components for the purpose of easily and simply describing the preferred embodiment of the present invention. In other words, it should be understood that these discrete elements in FIG. 2 represent functional components which may be combined or separated at will.

In FIG. 2, the data transmitted over communication link 105 is in TDM format. In the preferred embodiment, the incoming TDM data stream can be a T3 or E3 carrier (equivalent to 28 T1 or 16 E1 link channels) which carries data serially (i.e., bit by bit) to MCSC 140, which converts the serial data into parallel format before the data enters SP 200. Specifically, in the preferred embodiment, the serial data stream is converted into two parallel bytes which are forwarded to SP 200. In other words, the bits in the bit by bit serial data stream are held long enough to form two bytes, and these two bytes are forwarded in parallel to SP 200, thereby allowing SP 200 to work with two bytes at a time, rather than bit by bit. In addition, MCSC 140 keeps track of which bits are from which channels in the TDM input stream. Each channel is identified by a channel ID, and MCSC 140 forwards the appropriate channel ID with the two parallel bytes to SP 200.

However, it should be noted that, although preferable, this serial-to-parallel conversion is not necessary to the present invention. If such conversion is not performed on the data stream before it enters SP 200, serial-to-parallel conversion may be performed inside SP 200, or it is conceivable that such conversion is not performed, but rather the individual bits are latched into a register as they flow through SP 200. Thus, the data stream may flow through SP 200 bit by bit in one embodiment, or by multiple parallel bytes in another embodiment. Currently, the best mode is for the data stream to flow through SP 200 as a data stream of two parallel bytes. Two bytes is the preferred size because (1) it takes very little time to perform such a conversion; and (2) SP 200 can perform extremely quick parsing on such a small number of bits.

In the preferred embodiment, SP 200 is configured to support Frame Relay data traffic (including FRF.11 Voice over FR; FRF.12, FR Fragmentation; FRF.15, End-to-End Multilink Frame Relay; FRF.16, Multilink Frame Relay UNI/NNI) and Multilink Point-to-Point (MPPP) data traffic (RFCs 1990 & 2686). On the incoming T3 carrier, SP 200 can support up to 256 MPPP links and up to 1024 Frame Relay connections (i.e., 1024 Data Link Connection Identifiers (DLCIs)). The 256 MPPP link channels can be in one MPPP bundle, or can be distributed in up to 64 MPPP bundles. In addition, the preferred embodiment of SP 200 supports from 4 to 16 Class of Service (CoS) levels.

When the two parallel bytes arrive at SP 200, they are put in FIFO (First-In, First-Out) stack 210, where they will be processed by Logic Unit or Microsequencer 250 and forwarded to Network Controller 100. The channel ID of the two bytes is also received and stored by FIFO stack 210. The Channel Configuration Module 215 has Channel Configuration Entries 215A for each of the current channels. The Channel Configuration Module 215 can find the Channel Configuration Entry corresponding to particular bytes on FIFO stack 210 by using the matching channel ID in FIFO stack 210. The Channel Configuration Entries 215A are supplied by a master processor unit 121 (which may, or may not, be part of Network Controller 100). Because software running on master processor unit 121 can control exactly what SP 200 does to incoming bytes on a channel by channel basis, SP 200 is tremendously flexible in its operation.

In the preferred embodiment, each of the Channel Configuration Entries 215A is 32 bits long, and contains fields indicating, for example, the mode (Frame Relay or MPPP), the Frame Relay mode (FRF.11, FRF.15, or FRF.16), the type of MPPP header (long or short), the bundle status (whether the channel is part of a bundle), and the bundle identifier (indicating to which MPPP bundle this channel belongs). Some fields contain instructions for particular actions to be taken. For example, one field (comprised of a bit) indicates whether to delete the fragment header of fragments in the particular channel. If this bit is set, the fragment header will be deleted by SP 200 if the channel is in MPPP mode. If this bit is set and the channel is in Frame Relay mode, deletion of the fragment headers will depend on the Frame Relay mode of the channel. If this bit is clear, no fragment headers are deleted by SP 200.

Some bit fields have a function dependent on a particular channel mode. Thus, if the channel is in MPPP mode, the bits will signify one type of data and, if the channel is in Frame Relay mode, the bits may signify a different type of data. Some bit fields indicate that a particular action should be taken if a certain condition is met. For example, one field (comprised of a bit) may indicate whether Class of Service (CoS) handling is supported. If this bit is not set (thus indicating there is no CoS support) and Logic Unit 250 discovers that the CoS field in an incoming PPP packet header has a nonzero value, Logic Unit 250 will mark the incoming PPP packet as having a protocol error (i.e., that the CoS field bits of the packet have been used in a manner inconsistent with what was expected).

Obviously, the configuration entry fields in the preferred embodiment assume that each channel is either part of a Frame Relay or MPPP data link transmission. However, the present invention is not limited to these protocols, and the fields for the channel configuration entries in another embodiment which uses one or more different data link protocols would be appropriate for the one or more data link protocols being used.

As described above, the Channel Configuration Module 215 holds information concerning the channel to which the various two byte portions in FIFO stack 210 belong. In fact, some of the information will indicate to Logic Unit 250 what actions to perform on the incoming data. For example, if the Channel Configuration Module 215 indicates that the channel is in MPPP mode and the delete fragment header bit is set, Logic Unit 250 will delete the fragment headers on that channel. In other words, Channel Configuration Module 215 indicates the appropriate program subroutine for Logic Unit 250 to apply to the incoming bytes. In the preferred embodiment, Logic Unit 250 has an instruction set consisting of 32 bit LIW (Long Instruction Words) or opcodes (operation codes). These opcodes are stored in Program Module 230.

The opcodes contained in Program Module 230 are downloaded from a master processor unit 121 (which may, or may not, be part of Network Controller 100, and which may, or may not, be the same master processor as the one which controls Channel Configuration Module 215). Although the opcodes indicate exactly what specific actions to take (e.g., moving data from this register to another register), the configuration information from Channel Configuration Module 215 indicates what subroutines to apply to incoming data. Thus, Logic Unit 250 is guided in what to do by a combination of opcodes from Program Module 255 and control information from Channel Configuration Module 215. In the preferred embodiment, the opcodes in Program Module 230 are not often changed by master processor 121, because the instruction set rarely needs to be changed. Most of the adjusting that needs to be done for the adding or dropping channels can be performed by software on master processor 121 which changes the entries in the Channel Configuration Module 215. The ability of the master processor to alter the opcodes in Program Module 230 allows the SP 200 to be tailored to accommodate global system changes in the format of received data, i.e., if a protocol changes, thereby requiring different computations or logical steps to be performed when parsing data on a channel using that protocol, opcodes can be added or modified to meet the new need.

As the data flows into FIFO stack 210, bytes from different channels will stack up behind each other. As an example, consider the following situation: four sets of two parallel bytes from Channel #5 are stacked in FIFO stack 210, and then one or more sets of two parallel bytes from Channel #14 arrives and is stacked behind the bytes from Channel #5. The appropriate program subroutines (comprised of a series of opcodes) for Logic Unit 250 (as indicated by the channel configuration entries) may be completely different for Channels #5 and #14. However, when the bytes from Channel #14 are on top of FIFO stack 210 (and thus ready to be parsed/acted upon by Logic Unit 250), the Logic Unit 250 may be in the middle of a program subroutine for the bytes from Channel #5. Such a situation calls for a "context switch", where the Channel #5 bytes, the relevant opcode, and program counter information (e.g., the program line in the subroutine) are "switched out", i.e., temporarily stored elsewhere, while the Channel #14 bytes and program subroutine are "switched in".

In the preferred embodiment, the Context Switch Module 220 performs the functions of recognizing that a context switch is needed and then moving and saving the appropriate information. Thus, Context Switch Module 200 includes a memory for temporarily storing the bytes, the appropriate opcodes, and the appropriate state information for one particular channel, as well as the logic for recognizing when a context switch is needed. In the preferred embodiment, the Context Switch Module 200 makes a copy of the bytes, thereby letting the original bytes stream through to the output. However, in other embodiments, the bytes could be held and released later for output. This function could be performed by Logic Unit 250.

Logic Unit (or Microsequencer) 250 extracts certain information from the channels in the incoming data stream and forwards the information to Memory 123 in Network Controller 100. In the preferred embodiment, packet headers are extracted and used by Network Controller 100 to process the incoming data stream more rapidly. For example, parsed sequence numbers from packet headers stored in Memory 123 are used by Network Controller 100 to arrange the packets being formed into proper order, without requiring that Network Controller 100 parse the packets. It is contemplated that other embodiments may extract different types of information from the incoming data stream. It is also contemplated that the parsed information could be used by other components besides Network Controller 100, and could be used for many varied purposes besides helping to organize the processing of packets by Network Controller 100.

As has been described with reference to a preferred embodiment above, a stream parser according to the present invention can extract useful information from an incoming data stream before the data stream is reconstructed by the network controller. Such information can be parsed from the data stream (e.g., reading a portion of a packet header) or generated by the stream parser analyzing the stream (e.g., identifying errors per defragment packet). Furthermore, it is possible for the stream parser to add, remove, or modify channel parameters or even modify the data stream itself as the data stream flows through the stream parser. For example, the stream parser can discard idle or null packets on incoming SS7 (Signaling System 7) channels so that the Network Controller does not waste time and resources reconstructing and identifying them. As another example, the stream parser can add or remove an MPPP link channel from an MPPP bundle. As yet another example, the stream parser can identify and report errors per defragment packet to the Network Controller which will determine whether to discard or process packets. As still another example, the stream parser can re-order the data flow, by changing the sequence of bytes within the data stream.

Figure 3:
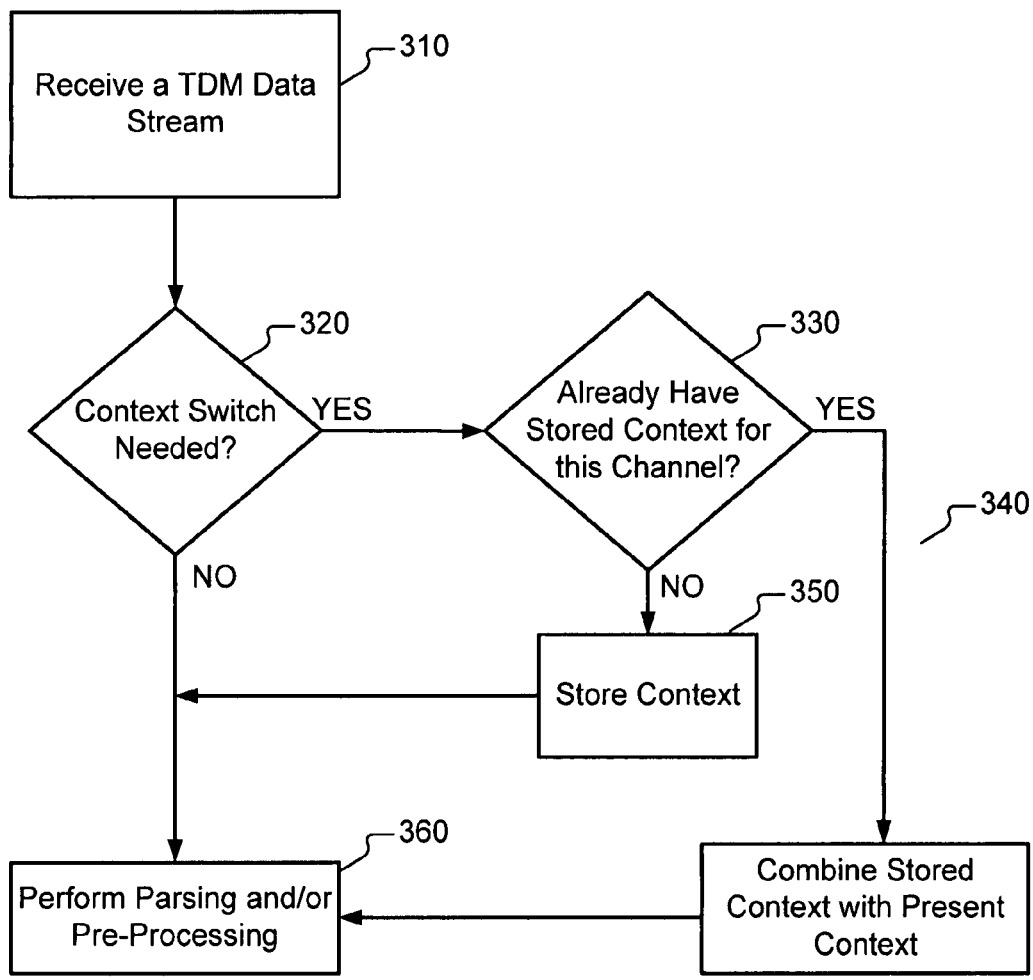
FIG. 3 is a flowchart of an abstracted series of steps performed in accordance with the preferred embodiment of the present invention.

FIG. 3 is a flowchart of an abstracted series of steps performed in accordance with the preferred embodiment of the present invention. In step 310, SP 200 receives the multi-channel TDM data stream. Although presented here as a single step, SP 200 is actually continuously receiving the multi-channel TDM data stream. In step 320, Context Switch Module 220 determines whether a context switch is needed, based on the bytes that are presently exiting the FIFO stack 210. In other words, Context Switch Module 220 determines if the incoming bytes are from a different channel than the bytes being currently processed by Logic Unit 250 (and these incoming bytes need to be parsed and/or pre-processed). If a context switch is required, what happens next depends on what occurred before. If context had previously been stored for this channel (step 330), the present context is combined with the stored context (step 340). If context had not previously been stored for this channel (step 330), the present context is simply stored (step 350).

If a context switch is not needed (step 320), or after the present context is stored (step 350), or after the present context is combined with the stored context (step 340), Logic Unit 350 performs parsing and/or pre-processing on the incoming bytes (if necessary). If after step 340, Logic Unit 350 may be working on the combined contexts from the Context Switch Module 220.

Having described a preferred embodiment of the present invention, some of its advantages may be seen. First, because communication unit (i.e., data packet) information may be parsed before the communication units are formed, and may be available to the Network Controller 100 while the communication units are being formed, the Network Controller saves resources (and time) in processing the communication units. Second, because the SP 200 is directed by channel configuration entries, it is extremely flexible in handling incoming data traffic, since a master processor may alter how the Logic Unit 250 parses and/or alters data traffic passing therethrough. Third, because the SP 200 is partially controlled by opcode at a machine language level, the SP 200 can handle incoming data traffic quickly. Furthermore, because both the opcodes and the channel configuration entries can be manipulated by a master processor, the SP 200 is not dedicated to any particular protocol.

In contrast to prior art packet parsers, a stream parser according to the present invention allows data traffic to "flow through" (i.e., the data traffic is not stopped, queued, and reconstructed), thereby providing the parsing and/or pre-processing function without slowing down the data flow. Furthermore, when the originally transmitted data packets are finally reconstructed downstream, it can be done much more quickly and efficiently, because of the information parsed by the inventive stream parser and/or the pre-processing performed by the inventive stream parser.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A stream parser for parsing incoming network data traffic, comprising:
   an input for receiving a time division multiplexed (TDM) multi-channel data stream;
   a context switch module to selectively store a first portion of the received TDM multi-channel data stream when an incoming second portion from the input is from a different channel than the first portion, wherein the first portion is being stored to be combined with a subsequently received third portion of the received TDM multi-channel data stream, wherein the first portion and the subsequently received third portion belong to the same channel;
   a logic unit in communication with said input and said context switch module for performing at least one of parsing and altering the received TDM multi-channel data stream, wherein said logic unit performs at least one of parsing and altering on the combined first and third portions; and
   an output for transmitting the TDM multi-channel data stream.

2. The stream parser of claim 1, wherein the context switch module recognizes when a context switch is needed, and performs said context switch.

3. The stream parser of claim 2, wherein performing said context switch comprises the storing the first portion of the received TDM multi-channel data stream when the incoming second portion from the input is from a different channel than the first portion.

4. The stream parser of claim 3, wherein performing said context switch further comprises storing microcode instructions for the Logic Unit and program counter information, wherein said microcode instructions and program counter information concern the first portion being stored.

5. The stream parser of claim 1, wherein the logic unit parses the received TDM multi-channel data stream by extracting data from packet headers of packets in the data stream.

6. The stream parser of claim 1, wherein the output transmits the TDM multi-channel data stream in substantially the same order as the received TDM multi-channel data stream.

7. The stream parser of claim 1, wherein the logic unit changes the sequence of bytes of the received TDM multi-channel data stream.

8. The stream parser of claim 1, wherein the logic unit alters at least one of at least one bit and at least one byte of the received TDM multi-channel data stream.

9. The stream parser of claim 1, wherein the logic unit deletes a plurality of non-contiguous bytes in the received TDM multi-channel data stream to thereby delete a data packet on a channel in the received TDM multi-channel data stream.

10. The stream parser of claim 1, further comprising:
    a channel configuration module for receiving and storing channel configuration entries, wherein each of the channel configuration entries comprises information concerning a particular channel in the TDM multi-channel data stream, and wherein the channel configuration entries provide direction to the logic unit for processing the received TDM multi-channel data stream.

11. The stream parser of claim 10, wherein the information concerning a particular channel in the TDM multi-channel data stream comprises direction for the logic unit to alter at least one of at least one bit and at least one byte of the received TDM multi-channel data stream.

12. The stream parser of claim 10, wherein a master processor provides channel configuration entries to the channel configuration module.

13. The stream parser of claim 10, wherein the input receives parallel data converted from a TDM multi-channel data stream by a Multi-Channel Serial Controller (MCSC) and wherein the MCSC provides a channel identification for the parallel formatted feed to the stream parser.

14. The stream parser of claim 1, wherein the input receives the TDM multi-channel data stream a portion at a time, wherein said portion is at least one bit and less than a data packet.

15. The stream parser of claim 1, wherein the context module stores further portions of the received TDM multi-channel data stream, wherein the further stored portions are combined with the combined first and third portions.

16. The stream parser of claim 1, further comprising:
a program module for storing microcode to be run on the logic unit.

17. The stream parser of claim 1, wherein the TDM multi-channel data stream is at least one of Multi-link Point-to-Point Protocol (MPPP) and Frame Relay data traffic.

18. The stream parser of claim 1, wherein the input is a first in, first out (FIFO) stack.

19. A method for at least one of parsing and pre-processing incoming data traffic, comprising the steps of:
receiving a time division multiplexed (TDM) multi-channel data stream;
selectively storing a first portion of the received TDM multi-channel data stream when an incoming second portion is from a different channel than the first portion,
combining the first portion with a subsequently received third portion of the received TDM multi-channel data stream, wherein the first portion and the subsequently received third portion belong to the same channel; and
performing at least one of parsing and altering the received TDM multi-channel data stream,
wherein said step of performing at least one of parsing and altering is performed on the combined first and third portions.

20. The method of claim 19, further comprising the step of:
recognizing when a context switch is needed, and performing said context switch.

21. The method of claim 20, wherein performing said context switch comprises said step of storing the first portion of the received TDM multi-channel data stream when the incoming second portion from the input is from a different channel than the first portion.

22. The method of claim 21, wherein the context switch further comprises the step of:
storing program counter information and microcode instructions for the step of performing at least one of parsing and altering the received TDM multi-channel data stream, wherein said microcode instructions and program counter information concern the first portion being stored.

23. The method of claim 19, wherein the step of performing at least one of parsing and altering the received TDM multi-channel data stream comprises the step of:
extracting data from packet headers of packets in the data stream.

24. The method of claim 19, further comprising the step of:
transmitting the TDM multi-channel data stream in substantially the same order as the received TDM multi-channel data stream.

25. The method of claim 19, wherein the step of performing at least one of parsing and altering the received TDM multi-channel data stream comprises the step of:
changing the sequence of bytes of the received TDM multi-channel data stream.

26. The method of claim 19, wherein the step of performing at least one of parsing and altering the received TDM multi-channel data stream comprises the step of:
altering at least one of at least one bit and at least one byte of the received TDM multi-channel data stream.

27. The method of claim 19, wherein the step of performing at least one of parsing and altering the received TDM multi-channel data stream comprises the step of:
deleting a plurality of non-contiguous bytes in the received TDM multi-channel data stream to thereby delete a data packet on a channel in the received TDM multi-channel data stream.

28. The method of claim 19, further comprising the step of:
receiving and storing channel configuration entries, wherein each of the channel configuration entries comprises information concerning a particular channel in the TDM multi-channel data stream, and wherein the channel configuration entries provide direction for the step of performing at least one of parsing and altering the received TDM multi-channel data stream.

29. The method of claim 28, wherein the information concerning a particular channel in the TDM Multi-channel data stream comprises direction to alter at least one of at least one bit and at least one byte of the received TDM multi-channel data stream.

30. The method of claim 19, wherein the step of receiving a time division multiplexed (TDM) multi-channel data stream in an input comprises:
receiving the TDM multi-channel data stream a portion at a time, wherein said portion is at least one bit and less than a data packet.

31. The method of claim 19, further comprising the step of:
storing further portions of the received TDM multi-channel data stream, wherein the further stored portions are combined with the combined first and third portions, and wherein said step of performing at least one of parsing and altering is performed on the combined first, third, and further portions.

32. The method of claim 19, wherein the TDM multi-channel data stream is at least one of Multi-link Point-to-Point Protocol (MPPP) and Frame Relay data traffic.

33. A communications system, comprising:
a stream parser for receiving a time division multiplexed (TDM) multi-channel data stream from a wide area network (WAN), said stream parser comprising:
a context switch module for selectively storing a first portion of the received TDM multi-channel data stream when an incoming second portion is from a different channel than the first portion, wherein the first portion is being stored to be combined with a subsequently received third portion of the received TDM multi-channel data stream, wherein the first portion and the subsequently received third portion belong to the same channel;

a logic unit in communication with said context switch module for performing at least one of parsing and altering the received TDM multi-channel data stream, wherein said logic unit performs at least one of parsing and altering on the combined first and third portions; and an output for transmitting the TDM multi-channel data stream; and a network controller for receiving the TDM multi-channel data stream transmitted by the stream parser and for transmitting the received TDM multi-channel data stream to addressable processor in a local area network (LAN).

34. The system of claim 33, wherein the context switch module recognizes when a context switch is needed, and performs said context switch.

35. The system of claim 34, wherein performing said context switch comprises the storing the first portion of the received TDM multi-channel data stream when the incoming second portion from the input is from a different channel than the first portion.

36. The system of claim 35, wherein the context switch further comprises storing microcode instructions for the Logic Unit and program counter information, wherein said microcode instructions and program counter information concern the first portion being stored.

37. The system of claim 33, wherein the logic unit parses the received TDM multi-channel data stream by extracting data from packet headers of packets in the data stream.

38. The system of claim 33, wherein the output transmits the TDM multi-channel data stream in substantially the same order as the received TDM multi-channel data stream.

39. The system of claim 33, wherein the logic unit changes the sequence of bytes of the received TDM multi-channel data stream.

40. The communication system of claim 33, wherein the logic unit alters at least one of at least one bit and at least one byte of the received TDM multi-channel data stream.

41. The communication system of claim 33, wherein the logic unit deletes a plurality of non-contiguous bytes in the received TDM multi-channel data stream to thereby delete a data packet on a channel in the received TDM multi-channel data stream.

42. The communication system of claim 33, wherein the stream parser further comprises:

a channel configuration module for receiving and storing channel configuration entries, wherein each of the channel configuration entries comprises information concerning a particular channel in the TDM multi-channel data stream, and wherein the channel configuration entries provide direction to the logic unit for processing the received TDM multi-channel data stream.

43. The communication system of claim 42, wherein the information concerning a particular channel in the TDM multi-channel data stream comprises direction for the logic unit to alter at least one of at least one bit and at least one byte of the received TDM multi-channel data stream.

44. The communication system of claim 42, further comprising:

a master processor for providing channel configuration entries to the channel configuration module.

45. The communication system of claim 33, wherein the stream parser receives the TDM multi-channel data stream a portion at a time, wherein said portion is at least one bit and less than a data packet.

46. The communication system of claim 33, wherein the context module stores further portions of the received TDM multi-channel data stream, wherein the further stored portions are combined with the combined first and third portions.

47. The communication system of claim 33, wherein the stream parser further comprises:

a program module for storing microcode to be run on the logic unit.

48. The communication system of claim 33, wherein the TDM multi-channel data stream is at least one of Multi-link Point-to-Point Protocol (MPPP) and Frame Relay data traffic.

49. The communication system of claim 33, wherein the stream parser is integrated into the network controller.

50. The communication system of claim 33, further comprising:

a Multi-Channel Serial Controller (MCSC) for converting a TDM multi-channel data stream into parallel data and for inputting the converted data stream to the stream parser, wherein said MCSC provides a channel identification for the parallel data to the channel configuration module.

51. An apparatus for parsing incoming network data traffic, comprising:

an input means for receiving a time division multiplexed (TDM) multi-channel data stream;

a context switch means for selectively storing a first portion of the received TDM multi-channel data stream when an incoming second portion is from a different channel than the first portion, and for combining the stored first portion with a subsequently received third portion of the received TDM multi-channel data stream, wherein the first portion and the subsequently received third portion belong to the same channel;

a logic means for performing at least one of parsing and altering the received TDM multi-channel data stream, wherein said means performs at least one of parsing and altering on the combined first and third portions; and an output means for transmitting the TDM multi-channel data stream.

52. The apparatus of claim 51, wherein the context switch means recognizes when a context switch is needed, and performs said context switch.

53. The apparatus of claim 52, wherein performing said context switch comprises the storing of the first portion of the received TDM multi-channel data stream when the incoming second portion from the input is from a different channel than the first portion.

54. The apparatus of claim 53, wherein performing said context switch further comprises storing microcode instructions for the Logic Unit and program counter information, wherein said microcode instructions and program counter information concern the first portion being stored.

55. The apparatus of claim 51, wherein the logic means parses the received TDM multi-channel data stream by extracting data from packet headers of packets in the data stream.

56. The apparatus of claim 51, wherein the output means transmits the TDM multi-channel data stream in substantially the same order as the received TDM multi-channel data stream.

57. The apparatus of claim 51, wherein the logic means alters the sequence of bytes of the received TDM multi-channel data stream.

58. The apparatus of claim 51, wherein the logic means alters at least one of at least one bit and at least one byte of the received TDM multi-channel data stream.

59. The apparatus of claim 51, wherein the logic means deletes a plurality of non-contiguous bytes in the received TDM multi-channel data stream to thereby delete a data packet on a channel in the received TDM multi-channel data stream.

60. The apparatus of claim 51, further comprising:
a channel configuration means for receiving and storing channel configuration entries,
wherein each of the channel configuration entries comprises information concerning a particular channel in the TDM multi-channel data stream, and
wherein the channel configuration entries provide direction to the means for performing at least one of parsing and altering the received TDM multi-channel data stream for processing the received TDM multi-channel data stream.

61. The apparatus of claim 60, wherein the information concerning a particular channel in the TDM multi-channel data stream comprises direction for the logic means to alter at least one of at least one bit and at least one byte of the received TDM multi-channel data stream.

62. The apparatus of claim 51, wherein the input means receives the TDM multi-channel data stream a portion at a time, wherein said portion is at least one bit and less than a data packet.

63. The apparatus of claim 51, wherein the context switch means stores further portions of the received TDM multi-channel data stream,
wherein the further stored portions are combined with the combined first and third portions.

64. The apparatus of claim 51, wherein the TDM multi-channel data stream is at least one of Multi-link Point-to-Point Protocol (MPPP) and Frame Relay data traffic.

65. A computer readable medium embodied with a program of instructions for execution by a programmable device for performing a method of at least one of parsing and pre-processing incoming data traffic, the program of instructions comprising:
instructions for performing at least one of parsing and altering a received time division multiplexed (TDM) multi-channel data stream;
wherein a stream parser comprises the programmable device;
wherein the stream parser further comprises means for selectively storing a first portion of the received TDM multi-channel data stream when an incoming second portion is from a different channel than the first portion, and means for combining the stored first portion with a subsequently received third portion of the received TDM multi-channel data stream,
wherein the first portion and the subsequently received third portion belong to the same channel; and
wherein at least one of said instructions are for performing at least one of parsing and altering on the combined first and third portions.

66. The device-readable medium of claim 65, wherein said instructions comprise:
microcode instructions for extracting data from packet headers of packets in the data stream.

67. The device-readable medium of claim 65, wherein said instructions comprise:
instructions for changing the sequence of bytes of the received TDM multi-channel data stream.

68. The device-readable medium of claim 65, wherein said instructions comprise:
instructions for altering at least one of at least one bit and at least one byte of the received TDM multi-channel data stream.

69. The device-readable medium of claim 65, wherein said instructions comprise:
instructions for deleting a plurality of non-contiguous bytes in the received TDM multi-channel data stream to thereby delete a data packet on a channel in the received TDM multi-channel data stream.

70. The device-readable medium of claim 65, wherein the stream parser receives the TDM multi-channel data stream a portion at a time, wherein said portion is at least one bit and less than a data packet.

71. The device-readable medium of claim 65, wherein the received TDM multi-channel data stream is at least one of Multi-link Point-to-Point Protocol (MPPP) and Frame Relay data traffic.

72. A computer readable medium embodied with a program of instructions for execution by a master device which controls at least one of parsing and pre-processing incoming data traffic, the program of instructions comprising:
instructions for creating and transmitting channel configuration entries to a stream parser,
wherein each of the channel configuration entries comprises information concerning a particular channel in an incoming time division multiplexed (TDM) multi-channel data stream, and wherein the channel configuration entries provide direction for the stream parser to perform at least one of parsing and altering the received TDM multi-channel data stream;
wherein the stream parser comprises means for selectively storing a first portion of the received TDM multi-channel data stream when an incoming second portion is from a different channel than the first portion, and means for combining the stored first portion with a subsequently received third portion of the received TDM multi-channel data stream, wherein the first portion and the subsequently received third portion belong to the same channel; and
wherein the stream parser performs at least one of parsing and altering on the combined first and third portions.

73. The device-readable medium of claim 72, wherein the channel configuration entries provide direction for the stream parser to extract data from packet headers of packets in the data stream.

74. The device-readable medium of claim 72, wherein the channel configuration entries provide direction for the stream parser to alter at least one of at least one bit and at least one byte of the received TDM multi-channel data stream.

75. The device-readable medium of claim 72, wherein the channel configuration entries provide direction for the stream parser to change the sequence of bytes of the received TDM multi-channel data stream.

76. The device-readable medium of claim 72, wherein the channel configuration entries provide direction for the stream parser to delete a plurality of non-contiguous bytes in the received TDM multi-channel data stream to thereby delete a data packet on a channel in the received TDM multi-channel data stream.

77. The device-readable medium of claim 72, wherein the stream parser receives the TDM multi-channel data stream a portion at a time, wherein said portion is at least one bit and less than a data packet.

78. The stream parser of claim 1, wherein the third portion is combined and stored with the first portion via the context switch module.

79. The stream parser of claim 1, wherein said received TDM multi-channel data stream is based on originally transmitted data packets, and
wherein the third portion is combined and stored with the first portion before reconstructive ordering of said originally transmitted data packets.

80. The stream parser of claim 1, wherein the third portion is combined and stored with the first portion in the context switch module.

81. The stream parser of claim 1, wherein the context switch module performs a context switch based on reception of TDM data from different channels.

82. The stream parser of claim 80, wherein said context switch module combines and stores non-contiguous bytes of the multi-channel data stream.

83. The stream parser of claim 1 further comprising a channel configuration module that receives and stores channel configuration subroutines for a channel of the TDM multi-channel data stream,
wherein the logic unit processes the TDM multi-channel data stream based on a selected one of said subroutines.

84. The stream parser of claim 83, wherein the logic unit receives one of said subroutines from said channel configuration module based on a channel identification (ID) received by the stream parser.

85. The stream parser of claim 84, wherein the logic unit performs one of said subroutines on TDM channel data based on said channel ID.

86. The stream parser of claim 83, further comprising a program module that stores opcodes,
wherein the logic unit receives one of said opcodes based on said channel ID and moves TDM multi-channel data between registers of memory based on said opcode.

87. The stream parser of claim 1 wherein, during a context switch, said logic unit temporarily stores bytes, an opcode, and subroutine information for a first channel and receives bytes, an opcode, and subroutine information for a second channel.

88. The stream parser of claim 1 further comprising a first-in-first-out (FIFO) stack that receives the TDM multi-channel data stream,
wherein the context switch module and the logic unit receive bytes from said FIFO stack.

89. The stream parser of claim 88 wherein said FIFO stack receives bytes for a channel and an identification (ID) of said channel in a parallel byte format,
wherein the logic unit performs a context switch based on said ID.

90. The stream parser of claim 1 wherein said context switch module stores logic that indicates when to perform a context switch.

91. The stream parser of claim 13 wherein the MCSC provides the channel identification in association with a plurality of bytes of the TDM multi-channel data stream,
wherein said plurality of bytes are received in parallel with the channel identification.

92. The communication system of claim 33, wherein said network controller reconstructs an originally transmitted data stream based on the TDM multi-channel data stream and said at least one of parsed and altered first and third portions.

93. The communication system of claim 33, wherein said network controller comprises a processor that stores an opcode and a subroutine, and
wherein the logic unit stores, parses, and alters said first and third portions based on said opcode and said subroutine.

94. The communication system of claim 33, wherein said network controller arranges packets received from the logic unit based on headers of said packets.

95. The communication system of claim 94, wherein the stream parser extracts information from the TDM multi-channel data stream before said network controller arranges said packets, and
wherein the logic unit modifies the TDM multi-channel data stream based on said information before said network controller arranges said packets.

96. The communication system of claim 33, wherein the stream parser modifies channel parameters during flow of the TDM multi-channel data stream from the stream parser to the network controller.

97. The communication system of claim 33, wherein said input receives packets of the TDM multi-channel data stream,
wherein the stream parser removes selected ones of said packets before arrangement of other ones of said packets by the network controller in a proper order.

98. The communication system of claim 33, wherein the stream parser alters a number of multilink point-to-point (MPPP) channels within a MPPP bundle associated with the TDM multi-channel data.

99. The communication system of claim 33, wherein the stream parser identifies and reports errors per packet of the TDM multi-channel data stream, and
wherein said network controller selectively performs one of discards and processes a packet based on said errors.

100. The communication system of claim 33, wherein the stream parser alters data flow order of the TDM multi-channel data stream, and
wherein the network controller alters order of packets of the TDM multi-channel data after said altering of said data flow order.

* * * * *